United States Patent [19]

Waller

[11] 4,301,993
[45] Nov. 24, 1981

[54] GATE VALVE

[75] Inventor: Henry A. Waller, Woodland Hills, Calif.

[73] Assignee: Consolidated Controls Corporation, Bethel, Conn.

[21] Appl. No.: 82,969

[22] Filed: Oct. 9, 1979

[51] Int. Cl.³ .......................................... F16K 25/00
[52] U.S. Cl. ................................. 251/167; 251/169; 251/197
[58] Field of Search ............... 251/167, 169, 197, 199, 251/168

[56] References Cited

U.S. PATENT DOCUMENTS

| 680,714 | 8/1901 | Jefferson | 251/167 |
| 2,861,770 | 11/1958 | Bredtsohueiden | 251/196 X |
| 2,906,491 | 9/1959 | Young | 251/167 |
| 4,052,036 | 10/1977 | Schertler | 251/167 X |

FOREIGN PATENT DOCUMENTS 2315648 1/1977 France ................. 251/197

Primary Examiner—Harold W. Weakley
Attorney, Agent, or Firm—Mason, Kolehmainen, Rathburn & Wyss

[57] ABSTRACT

A new and improved gate valve suitable for use with high pressure, high temperature corrosive fluids such as those developed in coal gasification processes, uranium enrichment and the like comprises a valve body having a flow passage with a pair of opposed annular valve seats and a gate assembly mounted for movement transversely of the flow passage between a valve seat confronting position and an open position displaced transversely outwardly of the passage. The gate assembly includes a pair of flat spring flexure elements which support a pair of valve discs for movement toward and away from the valve seats when the assembly is in the valve seat confronting position. These flexure elements normally bias the valve discs out of engagement with the valve seats. The discs are interconnected by an upwardly bowed flexure element which is retained between upper and lower holding members connected to the transversely extending stem of the gate valve.

In a sequence of operation, the gate assembly is first moved transversely into the valve body to a valve seat confronting position in which the valve discs are aligned with but spaced from the opposed annular valve seats of the valve body. Continued movement of the valve stem exerts a downward force on the upwardly bowed flexure element so that it is flattened and forces the valve discs outwardly into engagement with the valve seats against the biasing force of the flexure disc mounting elements. The gate valve is opened by first relieving the pressure on the flattened upper flexure element so that it assumes its normal bowed configuration and in so doing moves the valve discs laterally away from the valve seats. The biasing action of the disc flexure mounting elements also assists in returning the discs to their spaced apart confronting position as soon as downward force on the upper flexure element is removed. The entire gate assembly is thereafter moved transversely out of the valve seat confronting position into the open position remote from the valve passage.

11 Claims, 5 Drawing Figures

GATE VALVE

BACKGROUND OF THE INVENTION

1. Field of the Invention

The present invention relates to gate valves and more particularly relates togate valves of the type designed for operation with high temperature, high pressure corrosive fluids such as those generated in coal gasification processes, uranium enrichment, and the like. Specifically, the invention is directed to gate valves of the block and bleed type which are used for applications requiring a minimum of leakage. In such blocking valves both upstream and downstream ports are sealed to permit evacuation or purging of the valve body at greater than line pressure to prevent through leakage of toxic media.

2. Description of the Prior Art

Over the years, a wide variety of gate valves and slide valves of various types have been developed. U.S. Pat. No. 380,037 discloses a valve for steam engines wherein valve members are supported on curved bows and are pressurized to expand against the opposing valve seats. U.S. Pat. No. 1,783,329 discloses a gate valve wherein opposite valve members are biased outwardly against the seats by a pair of coil springs. U.S. Pat. No. 2,541,968 discloses a gate valve wherein sloped wedging surfaces are provided for moving a pair of valve members outwardly against facing annular valve seats. U.S. Pat. No. 2,778,600 discloses a gate valve wherein leaf springs are provided for biasing a pair of valve gates to slide in a longitudinal direction with respect to each other and wedging forces are provided to cause the valve gate to move laterally apart for seating. U.S. Pat. No. 2,826,391 discloses a wedge valve wherein valve elements are wedged outwardly apart against valve seats. Another wedge valve is shown in U.S. Pat. No. 2,861,770. U.S. Pat. No. 3,478,771 discloses a sectional body gate valve with a valve seat scraper device having springs biasing the valve members apart from one another. U.S. Pat. No. 3,815,868 discloses a double disc gate valve wherein rotatable valve discs are used and are wedged apart for seating.

In these prior art arrangements the sliding or rotating joints which are provided to accomplish the desired movements of the gate valve are not suitable for use in high pressure, high temperature corrosive fluid applications such as coal gasification, uranium enrichment, or the like, because with such sliding or rotating joints there will be a buildup of material at the joint which binds the joint and jams the valve so that it does not operate properly. Also, parts which rub together can corrode and cause the valve to stick or not retract fully prior to lifting.

OBJECTS OF THE INVENTION

It is an object of the present invention to provide a new and improved gate valve of the character described.

It is an object of the invention to provide a new and improved gate valve especially adapted for operation with high temperature, high pressure, highly corrosive and abrasive fluids as are commonly generated in coal gasification processes, uranium enrichment, and the like.

Yet another object of the present invention is to provide a new and improved gate valve assembly wherein all sliding or rotating joints are eliminated while permitting the valve discs to be retracted and moved to a valve open position in response to movement of the valve stem actuator.

Still another object of the present invention is to provide a new and improved valve assembly having an operational sequence in closing wherein a gate assembly is first moved transversely into a confronting alignment with a valve seat without any scraping or sliding contact between a valve disc and valve seat and thereafter the valve disc is moved axially from the confronting position toward a closed position seated against the valve seat.

Another object of the present invention is to provide a new and improved gate valve assembly of the character described having a valve opening operational cycle wherein a valve disc is first moved axially away from seating engagement with an annular seat and thereafter is moved transversely out of a confronting position to a remotely transverse open position away from a flow passage in the valve body.

Yet another object of the present invention is to provide a new and improved gate valve assembly of the character described wherein one or more valve discs are mounted for axial movement toward and away from the annular seats from a confronting position and are normally resiliently biased away from seating contact with the adjacent valve seat so that upon release of valve closing pressure or force, the valve discs first move away from and out of contact with the valve seats before any transverse movement of the gate valve assembly is accomplished thereby eliminating any scraping action and minimizing wear between the valve discs and valve seats.

Yet another object of the present invention is to provide a new and improved gate valve of the character described wherein an automatic operating sequence is provided for opening and closing the valve in a manner so that transverse scraping action between the valve discs and valve seats does not occur.

Yet another object of the present invention is to provide a new and improved gate valve of the character described which is relatively simple in construction, fool-proof in operation and which has a high resistance to wear and abrasion when used with highly corrosive or abrasive, high-temperature and high-pressure fluids and the like.

BRIEF SUMMARY OF THE INVENTION

The foregoing and other objects and advantages of the invention are accomplished in an illustrated embodiment comprising a gate valve having a body with a flow passage and a pair of opposed annular valve seats formed therein. A gate assembly is mounted for movement transversely of the flow passage between a passage confronting position and an open position in which the assembly is displaced transversely outwardly of the valve body. An operator is provided for moving the gate assembly transversely between the confronting position and the open position and the gate assembly includes a pair of flat spring flexure elements which support a pair of valve discs for movement toward and away from the valve seats when the gate assembly is in the confronting position. These flexure support elements normally bias the valve discs away from the closed position. The discs are interconnected by an upwardly bowed flexure element which is retained between upper and lower holding members connected to the transversely extending steam of the gate valve.

During an operational cycle, the gate valve assembly is moved transversely into the valve body from an outer or open position to a confronting position wheein the valve discs are axially aligned with respect to the flow passage but in closely spaced-apart confronting relation with the annular valve seats at which point further movement of the gate assembly is prevented by a stop. Continued movement of an operator stem exerts a downward force on the upwardly bowed spring element so that this spring is flattened and the valve discs are forced outwardly into engagement with the opposed valve seats against the biasing force of the flexure mounting elements. The gate assembly is opened by first receiving the pressure on the flattened spring so that it assumes its normal bowed configuration and in so doing moves the discs transversly away from the valve seats to the spaced-apart confronting positions of these discs. The biasing action of the flexure mounting elements for the discs also assists in returning the discs to their spaced-apart confronting positions as soon as downward force on the bowed spring is removed. Thereafter, the entire gate assembly is moved transversely outwardly of the valve body toward the open position thereby permitting unobstructed flow through the passage as desired. The arrangement described eliminates all rotating or sliding joints because movement of the discs from their confronting position to their closed position is accomplished solely by flexing of the bowed spring and the flexure mounting elements. Accordingly, all scraping or frictional action between the surfaces of the valve discs and the annular valve seats as the gate assembly is moved transversely into and out of the valve body is avoided.

BRIEF DESCRIPTION OF THE DRAWINGS

For a better understanding of the invention, reference should be had to the following detailed description, taken in conjunction with the drawings, in which:

FIG. 5 is a fragmentary view similar to FIG. 1 and illustrating an alternative embodiment of the present invention.

DESCRIPTION OF THE PREFERRED EMBODIMENT

Figure 1:
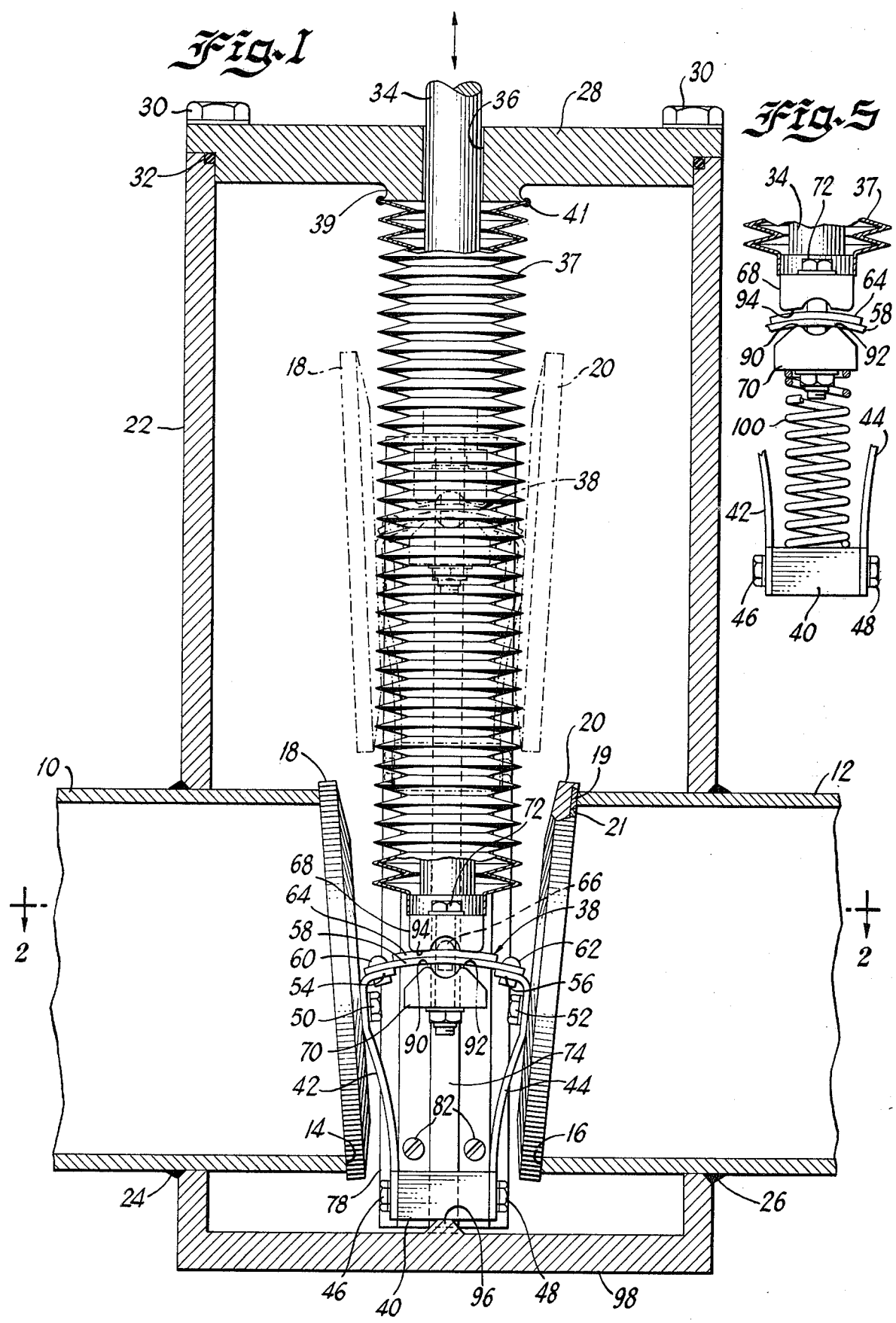
FIG. 1 is a longitudinal, cross sectional view of a new and improved gate valve construction in accordance with the present invention.
Figure 2:
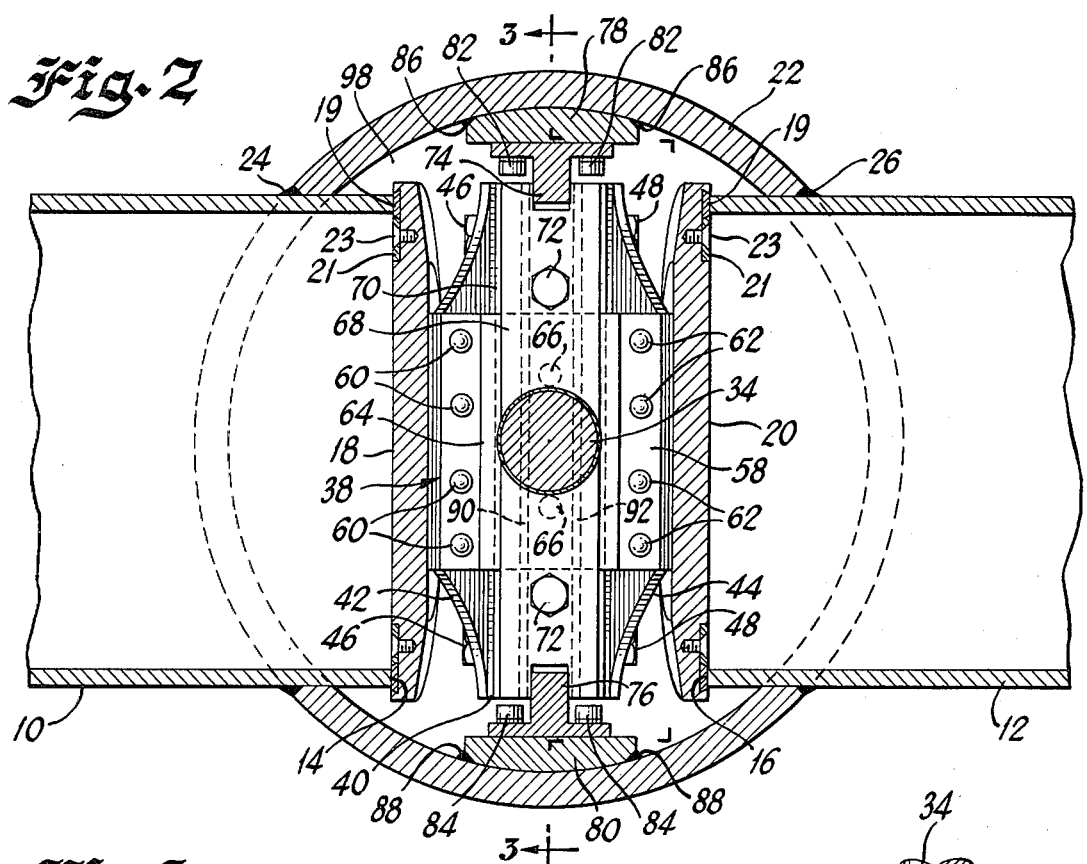
FIG. 2 is a sectional view taken along the lines 2—2 of FIG. 1.

Referring now to the drawings, the improved gate valve of the present invention is therein illustrated as comprising inlet and outlet conduits 10 and 12 the adjacent ends of which terminate in sloping annular end walls 14 and 16, respectively, which act as valve seats for the valve discs 18 and 20 of the gate valve when the valve is closed. A valve housing 22 which is of somewhat larger diameter than the conduits 10 and 12, extends transversely from and is secured to the conduits 10, 12 by means of the welds 24 and 26, the housing 22 being closed at the top thereof by means of the cover 28 which is secured to the upper end of the housing 22 by means of the bolts 30 and is sealed by means of the O-ring 32. A valve stem 34 extends through an opening 36 in the cover 28, the steam 34 being movable up and down by means of a suitable actuator (not shown) so that the entire gate valve assembly indicated generally at 38, which includes the valve discs 18 and 20, may be withdrawn transversely from the conduits 10, 12 to the valve open position shown in dotted lines in FIG. 1.

Figure 3:
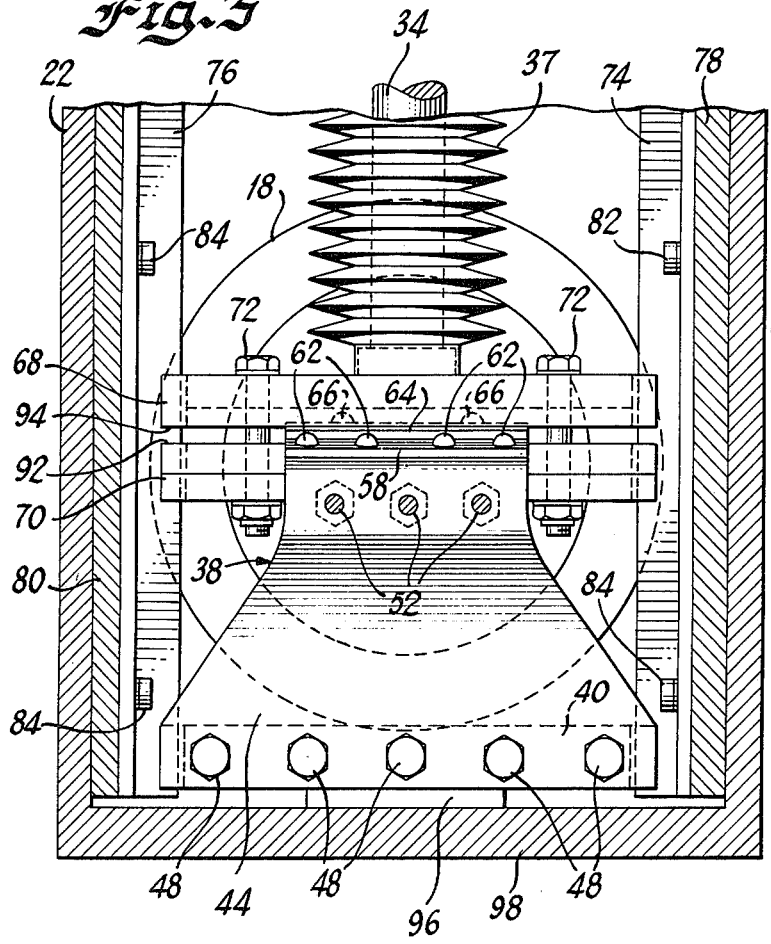
FIG. 3 is a sectional view taken along the lines 3—3 of FIG. 2.

Considering now the valve gate assembly 38 in more detail, this assembly comprises a base member 40 which supports a pair of relatively thin flexure mounting elements 42 and 44 which are secured to either side of the base 40 by means of the bolts 46 and 48, respectively. The flexure mounting elements 42 and 44 extend upwardly from the base 40 and taper inwardly, as best illustrated in FIG. 3, to provide a support for the valve discs 18 and 20, respectively, the valve disc 18 being secured to the flexure mounting element 42 by means of the bolts 50 and the valve disc 20 being secured to the flexure mounting element 44 by means of the bolts 52. The upper ends of the flexure mounting elements 42 and 44 are provided with inturned end portions 54 and 56 to which are secured the ends of an upwardly bowed spring member 58 by means of the rivets 60, 62. In the illustrated embodiment the spring member 58 is reinforced by another upwardly bowed spring member 64 which is secured to the spring member 58 by means of the rivets 66, thereby forming an upper flexure member which interconnects the valve discs 18 and 20. The upwardly bowed spring members 58 and 64 are positioned between an upper holding member 68 and a lower holding member 70 which extend transversely of the housing and are connected together outside the spring members 58, 64 by means of the bolts 72. The valve stem 34 is connected to the upper holding member 68 by any suitable means such as a threaded connection between these members, or the like.

The upper and lower holding members 68, 70 and the base member 40 are all provided with vertically extending grooves in the outer ends thereof for receiving guide bars 74, 76 which are positioned midway between the valve seats 14, 16 and extend upwardly along the sides of the housing 22. Specifically, the guide bars 74, 76 are secured to vertically extending plates 78, 80 by means of the bolts 82, 84, the plates 78, 80 being secured to the housing 22 by means of the welds 86, 88.

Figure 4:
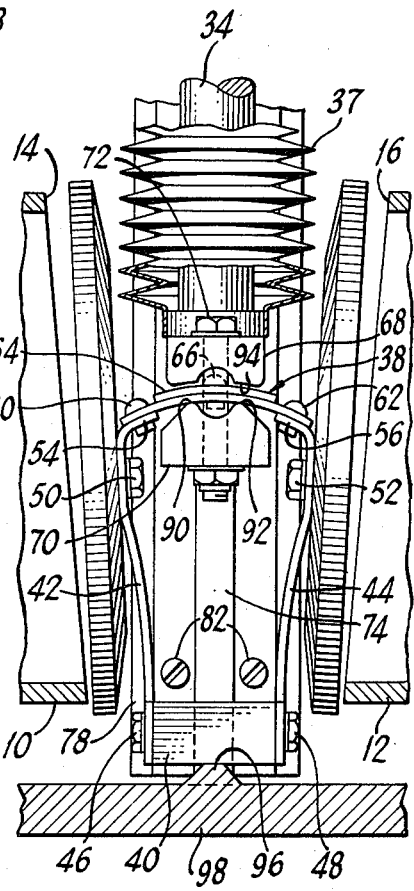
FIG.4 is a view similar to FIG. 1 but showing the valve with the valve discs withdrawn to a valve seat confronting position at which the gate valve assembly is ready to be withdrawn transversely from the valve body.

In accordance with an important aspect of the present invention, the flexure mounting elements 42, 44 are shaped during their initial forming operation so that when no downward force is exerted on the spring members 58, 64 the mounting elements 42, 44 occupy the position shown in FIG. 4 wherein the valve discs 18, 20 are positioned laterally inwardly from the valve seats 14, 16. Accordingly, when the gate valve assembly 38 is lowered from the open position shown in dotted lines in FIG. 1 to the position shown in FIG. 4, the valve discs 18, 20 are not expanded and hence the gate valve assembly may be readily moved to the valve seat confronting position shown in FIG. 4 without any scraping or grinding of the valve discs 18, 20 on the valve seats 14, 16.

During this lowering movement of the valve gate assembly the weight of the valve discs 18, 20, the flexure mounting elements 42, 44 and the base 40 rests on the lower holding member 70 which is provided with the upstanding transversely extending ridges 90, 92 which engage the underside of the upwardly bowed spring member 58, as shown in FIG. 4. The upper holding member 68 is provided with a curved bottom surface 94 to provide clearance between the member 68 and the upper surface of the spring member 64 during this lowering operation, to permit flexing of the spring members 58, 64 to their maximum bowed position, as shown in FIG. 4. In this connection it will be understood that if the valve discs 18, 20 are extremely large and have a diameter of several feet, the flexure mounting elements 42, 44 may need to be quite thick in order to support the weight of the disc 18, 20. In such instances, the flexure mounting elements 42, 44 are machined to have an unstressed shape as shown in FIG. 4 but are sufficiently flexible to bend outwardly as the valve discs 18, 20 are moved to the valve closed position shown in FIG. 1.

When the valve gate assembly 38 is lowered to the valve seat confronting position shown in FIG. 4 the base 40 of this assembly engages an upstanding ridge 96 which is formed in the bottom wall 98 of the housing 22 and acts as a stop member to prevent further downward movement of the base 40. However, as the valve stem 34 continues to move downwardly the bottom surface 94 of the upper holding member 68 engages the upper surface of the spring member 64 and exerts a downward force on the spring members 58, 64 tending to flatten these members and thereby force the valve discs 18, 20 outwardly into the valve closed position shown in FIG. 1 while at the same time the flexure supporting elements 42, 44 are flexed outwardly to the position shown in FIG. 1.

Due to the high mechanical advantage of the bowed spring elements 58, 64 as they are flattened by engagement with the downwardly moving member 68 an extremely large expansion force can be exerted on the valve discs 18, 20 so as to provide the necessary seating force to seal these discs on the valve seats 14, 16 against upstream pressure. Furthermore, this movement of the valve discs from the valve seat confronting position shown in FIG. 4 to the valve closed position shown in FIG. 1 does not involve any rotating or sliding movement of the valve discs 18, 20 with respect to their respective valve seats. Preferably each of the valve discs 18, 20 is provided with an annular sealing member 19, of Telfon or similar material, which is retained in place on the valve seating face of each disc by means of the annular seal retainer 21, the retainer 21 being held in place by means of the screws 23.

In order to permit evacuation or purging of the space within the housing 22 at greater than line pressure so as to prevent through leakage of toxic media, the valve stem 34 is sealed by means of a flexible metal bellows 37 which is secured at its upper end to a lip portion 39 formed in the underside of the cover 28 adjacent the opening 36, by means of a suitable weld joint 41, or the like. The bottom end of the bellows 37 is secured to the bottom end of the valve stem 34 adjacent the upper holding member 68 so that the stem 34 may be lifted by the valve actuator to the valve open position shown in dotted lines in FIG. 1 while the space within the housing 22 remains sealed. If desired, a packing may be used on the stem 34 to seal the interior of the bellows 37 from the atmosphere and permit back filling or evacuation to check for leakage.

When the gate valve of the present invention is to be opened, the stem 34 is moved upwardly from the position shown in FIG. 1. During the initial portion of this upward movement the force tending to flatten the spring elements 58, 64 is removed so that the valve discs 18, 20 are initially moved transversely of the valve seats to the valve seat confronting position shown in FIG. 4 without any sliding or rotating action between the valve discs and their respective seats. Furthermore, due to the high mechanical advantage of the upper flexure comprising the spring elements 58, 64, a large force is available tending to unseat the valve discs 18, 20, unseating of these discs also being aided by the biasing force of the flexure mounting elements 42, 44 which have been flexed out of their normal position shown in FIG. 4 when the spring elements 58, 64 are flattened and the valve discs 18, 20 moved into engagement with their respective valve seats. Accordingly, a large force is available to unseat the valve discs so that there can be no sticking or jamming of these discs as the valve gate assembly is moved to the valve open position. Also, this valve unseating action takes place automatically during the first increment of upward movement of the stem 34 and occurs before the lower holding member 70 engages the undersurface of the spring member 58 to lift the valve gate assembly, thereby insuring that the valve discs 18, 20 have been moved away from their respective valve seats before the valve gate assembly is moved transversely to the valve open position shown in dotted lines in FIG. 1.

As the ridges 90, 92 of the lower holding member 70 engage the under surface of the spring 58, the entire weight of the valve discs 18, 20, the flexure mounting elements 42, 44 and the base 40 is borne by the member 70, which tends to bow the spring elements 58, 64 upwardly, such bowing action further tending to collapse the valve discs 18, 20 toward each other as the valve gate assembly is moved to the valve open position.

It will be noted that the valve seats 14, 16 are provided with an upwardly opening wedge angle which assures generation of the maximum clearance between the valve gates 18, 20 and their respective valve seats as the valve gate assembly rises. It will also be noted that the sliding engagement between the valve gate assembly and the guide bars 74, 76 does not interfere with the operation of the gate valve. This is because the valve discs 18, 20 are first moved laterally away from the valve seats before the valve gate assembly is moved transversely out of the valve body to the valve open position. Accordingly, in stituations where a pressure differential exists between the upstream and downstream lines, the valve discs are first moved away from the valve seats so that the pressure on the upstream and downstream lines is equalized before the valve gate assembly is moved along the guide rails 74, 76. There is substantially no side thrust on the guide rails 74, 76 during such movement so that the valve gate assembly may be freely moved to the valve open position.

It will thus be seen that the present invention provides a mounting system for the valve discs 18, 20 which comprises three flexure members, i.e. the two flexure mounting elements 42 and 44, which have sufficient flexibility to permit the valve discs 18, 20 to swing outwardly onto the valve seats 14, 16, and an upper flexure element comprising the upwardly bowed springs 58 and 64 which interconnect the discs 18, 20 and when flattened provides an almost infinite mechanical advantage to both seat and unseat the valve discs from their respective valve seats when the gate assembly is in the valve seat confronting position.

If desired, a booster spring 100 (FIG. 5) can be positioned between the base member 40 and the under side of the bowed spring element 54. The booster spring 100 is depressed when the spring elements 54, 68 are flattened and assists the return of these spring elements 54, 68 to their bowed position as the valve discs 18, 20 are withdrawn laterally from the valve seats. The spring 100 preferably has a high spring rate so as to permit the actuator to compress this spring easily when the upper flexure 54, 64 is initially flattened. Conversely, the booster spring 100 provides maximum assistance to retract the valve discs 18, 20 when the upper flexure is almost flat.

While certain preferred embodiments of the invention have been described by way of illustration, many modifications will occur to those skilled in the art. It will be understood, of course, that it is not desired that the invention be limited thereto, since modifications may be made, and it is, therefore, contemplated by the appended claims to cover any such modifications as fall within the true scope and spirit of the invention.

What is claimed as new and desired to be secured by Letters Patent of the United States is:

1. A gate valve comprising:
    a valve body including a flow passage having a pair of spaced-apart annular valve seats defining a valve chamber therebetween;
    a valve gate assembly including a base mounted for transverse movement relative to said passage, a pair of valve discs, and a pair of flat spring flexure elements supporting said discs from said base, said flexure elements normally biasing said discs toward each other so that said assembly can be moved into and out of said chamber without engaging said valve seats,
    a normally bowed spring interconnecting said discs, and
    means operative after said assembly has been moved to a position in which said discs are aligned with said valve seats for forcing said discs into engagement with said valve seats solely by exerting a force on said bowed spring in the direction to force said discs apart.

2. The gate valve of claim 1, wherein said flexure elements are sufficiently flexible to permit said discs to be moved into engagement with said valve seats but cooperate with said bowed spring to return said discs to said normal position as soon as said force is removed.

3. The gate valve of claim 1, which includes stop means for limiting movement of said gate valve assembly in one direction.

4. The gate valve of claim 3, which includes a valve stem mounted for transverse movement relative to said passage, and means interconnecting said valve stem and said bowed spring so that upon movement of said stem in said one direction after said gate valve assembly engages said stop means said force is exerted on said bowed spring.

5. The gate valve of claim 4, wherein said interconnecting means comprises upper and lower holding members positioned on opposite sides of said bowed spring and connected to said valve stem.

6. The gate valve of claim 5, wherein said upper and lower holding members are slidably mounted in guide means extending transversely of said passage.

7. The gate valve of claim 6, wherein said base member is also slidably mounted in said guide means, thereby to guide said gate assembly as it is moved into and out of said chamber.

8. The gate valve of claim 5, which includes a housing enclosing said valve gate assembly and having an opening through which said valve stem extends, and means for sealing said opening.

9. The gate valve of claim 8, wherein said sealing means comprises a bellows surrounding said valve stem within said housing and connected at one end to said housing and at the other end to said upper holding member.

10. The gate valve of claim 5, wherein said lower holding member engages said bowed spring in the mid portion thereof so that the weight of said valve gate assembly increases the bow of said spring and movement of said discs away from said seats as said valve stem is raised and prior to movement of said valve gate assembly out of said aligned position.

11. The gate valve of claim 1, wherein said bowed spring is connected to said discs in the central region thereof so that a centrally applied force is exerted on said discs to seat the same on said seats.

* * * * *